(12) United States Patent
Hsu et al.

(10) Patent No.: US 7,522,248 B2
(45) Date of Patent: Apr. 21, 2009

(54) LIQUID CRYSTAL DISPLAY AND THIN FILM TRANSISTOR ARRAY SUBSTRATE THEREOF

(75) Inventors: Han-Tung Hsu, Taoyuan County (TW); Hui-Chung Shen, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 531 days.

(21) Appl. No.: 11/163,851

(22) Filed: Nov. 1, 2005

(65) Prior Publication Data
US 2007/0097281 A1    May 3, 2007

(51) Int. Cl.
*G02F 1/1333*   (2006.01)
*G02F 1/1345*   (2006.01)

(52) U.S. Cl. .................. 349/149; 349/40; 349/151; 349/152; 349/54

(58) Field of Classification Search .......... 349/40, 349/54–55, 192, 149–152; 324/770
See application file for complete search history.

(56) References Cited

U.S. PATENT DOCUMENTS

| 2002/0021375 | A1* | 2/2002 | Nakajima et al. ............. 349/40 |
| 2004/0263460 | A1* | 12/2004 | Lu .............................. 345/98 |
| 2005/0122460 | A1 | 6/2005 | Yokogawa et al. |

\* cited by examiner

*Primary Examiner*—Julie Ngo
(74) *Attorney, Agent, or Firm*—Jianq Chyun IP Office

(57) ABSTRACT

A thin film transistor array substrate is provided. A plurality of shield lines are disposed between the lead lines in a peripheral circuit region of the substrate. A connecting line connected to the shield lines is also disposed in peripheral circuit region of the substrate. The shield lines and the connecting line are formed of a metal layer so that light leakage between the lead lines of a source/drain layer or a gate layer is reduced. Furthermore, the line widths in the connecting portions of the shield lines connected to the connecting lines are smaller than the distance between the lead lines. Therefore, if a short happens between the lead lines and the shield lines, repair may be performed by cutting the connection portions between the shield lines and the connecting lines.

20 Claims, 8 Drawing Sheets

LIQUID CRYSTAL DISPLAY AND THIN FILM TRANSISTOR ARRAY SUBSTRATE THEREOF

BACKGROUND OF THE INVENTION

1. Field of Invention

The present invention generally relates to a liquid crystal display (LCD) and thin film transistor (TFT) array substrate thereof. More particularly, the present invention relates to a liquid crystal display and thin film transistor array substrate thereof including a peripheral circuit region with terminal-narrowed shield lines.

2. Description of Related Art

In recent years, with great advance in the fabricating technique of electrical-optical and semiconductor devices, flat panel displays (FPDs), such as liquid crystal displays (LCDs), have been developed. Due to the advantageous features of LCDs, for example, low operation voltage, no harmful radiation, light weight, and compact size, LCDs replace the conventional Cathode Ray Tube (CRT) monitors and become mainstream.

FIG. 1 is a simplified cross-sectional view of a conventional liquid crystal display module. The liquid crystal display module shown in FIG. 1 comprises a thin film transistor array substrate 110, a color filter substrate 120, a black matrix layer 122 thereon, a sealant 130, a liquid crystal layer 140, polarizing films 152, 154 and an outer frame 160. The black matrix layer 122 is disposed on the color filter substrate 120. The sealant 130 is disposed between the color filter substrate 120 and the thin film transistor array substrate 110. The liquid crystal layer 140 is disposed within the space bounded by the color filter substrate 120, the thin film transistor array substrate 110 and the sealant 130. Furthermore, the polarizing films 154, 152 are disposed on other sides of the thin film transistor array substrate 110 and the color filter substrate 120, respectively. The outer frame 160 is disposed on the polarizing film 152. In addition, the thin film transistor array substrate 110 can be divided into a pixel region 110a and a peripheral circuit region 110b. The peripheral circuit region 110b has a plurality of lead lines 112 therein for connecting pixels in the pixel region 110a and peripheral circuits in the peripheral circuit region 110b.

In a drop filling (ODF) process for forming the liquid crystal layer 140, if the sealant 130 is non-uniformly radiated by ultraviolet, the incompletely hardened sealant 130 may contaminate the liquid crystal 140. For this reason, the black matrix layer 122 on the color filter substrate 100 is slightly shrunk towards the center of the panel. However, because of the slight shrink of the black matrix layer 122, an area with light of leakage 170 is formed between the black matrix layer 122 and the sealant 130. In addition, there is no shield between the lead lines 112 within the peripheral circuit region 110b. Hence, light 180 emitted from the back light module may pass through the gaps between the lead lines 112, and light-leakage occurs at the junction between the outer frame 160 and the thin film transistor array substrate 110.

Therefore, in a prior solution, a shield layer, made of a first metal layer (M1) and a second metal layer (M2), is between the lead lines. FIG. 2 shows a partial top view of the peripheral circuit region of the thin film transistor array substrate. Referring to FIG. 2, each of a plurality of shield lines M10, made of the first metal layer, is disposed between two source lines S10, each made of the second metal layer. For leakage prevention, the shield line M10 is partially overlapped with two adjacent source leads S10. However, in case of particle contamination or static discharge, shorts occur at the overlap, for example, pointed by an arrow A10 in FIG. 2, between the shield line M10 and the source line S10. If so, a corresponding row of pixels is called a "bright line", and the panel is not qualified.

SUMMARY OF THE INVENTION

One of the objects of the invention is to provide a thin film transistor array substrate of liquid crystal liquid, for preventing occurrence of light-leakage and improving the yields.

Another object of the invention is to provide a thin film transistor array substrate of liquid crystal liquid, for preventing occurrence of light-leakage and improving the yields.

To at least achieve the above and other objects, the invention provides a thin film transistor array substrate. The thin film transistor array substrate comprises: a substrate; a thin film transistor array, a plurality of first lines, a plurality of second lines, a plurality of first shield lines and a first connection lines. The substrate includes a pixel region and a peripheral circuit region surrounding the pixel region. The thin film transistor array is disposed in the pixel region and includes a first conductive layer and a second conductive layer. The first lines are disposed on the peripheral circuit region, and the first lines are on the same layer of the first conductive layer. The second lines are disposed on the peripheral circuit region, and the second lines are on the same layer of the second conductive layer. The first shield lines are disposed on the peripheral circuit region, and the first shield lines are between and overlapped with the second lines for preventing lights pass through the gaps between the second lines. The first connection line is electrically connected to the first shield lines. The first shield lines and the first connection line are on the same layer of the first conductive layer. The connection parts of the first shield lines to the first connection lines have widths smaller than gaps between the first lines.

The invention discloses a liquid crystal liquid (LCD), comprising a foresaid thin firm transistor array substrate, an opposite substrate, and a liquid crystal layer. The liquid crystal layer is between the thin firm transistor array substrate and the opposite substrate and the thin firm transistor array is used for controlling arrangements of the liquid crystal layer.

In the LCD, the opposite substrate comprises a color filter film substrate. The LCD further includes a backlight module, formed besides the opposite substrate or the thin firm transistor array substrate, for emitting light to the liquid crystal display panel.

In one embodiment, each of the first shield lines has a side part overlapping with adjacent second lines.

In another embodiment, the thin firm transistor array substrate further comprises a plurality of second shield lines and a second connection line. The second shield lines are disposed on the peripheral circuit region. The second shield lines are between and overlapped with the first lines, for preventing lights pass through the gaps between the second lines. The second connection line is electrically connected to the second shield lines. The second shield lines and the second connection line are on the same layer of the second conductive layer. The connection parts of the second shield lines to the second connection lines have smaller widths than the gaps between the first lines. Besides, each of the second shield lines has a overlapped part with the first lines.

In still another embodiment, a predetermined voltage is coupled to the first shield lines and the first connection line. Furthermore, a predetermined voltage is coupled to the second shield lines and the second connection line.

In still another embodiment, the first conductive layer is a gate layer and the second conductive layer is a source/drain layer. Or, the first conductive layer is a source/drain layer and the second conductive layer is a gate layer.

As above, in the LCD module and the TFT array substrate thereof in the invention, the shield lines made of first or second metal layer are disposed in the peripheral circuit region for preventing leakage of light. Besides, by feeding predetermined voltages on the shield lines, the signal interference between gate/source lines is improved. In case of bright lines, the narrowed terminals of the shield lines are cut off by laser for repairing bright lines. Therefore, yield of the TFT module is improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
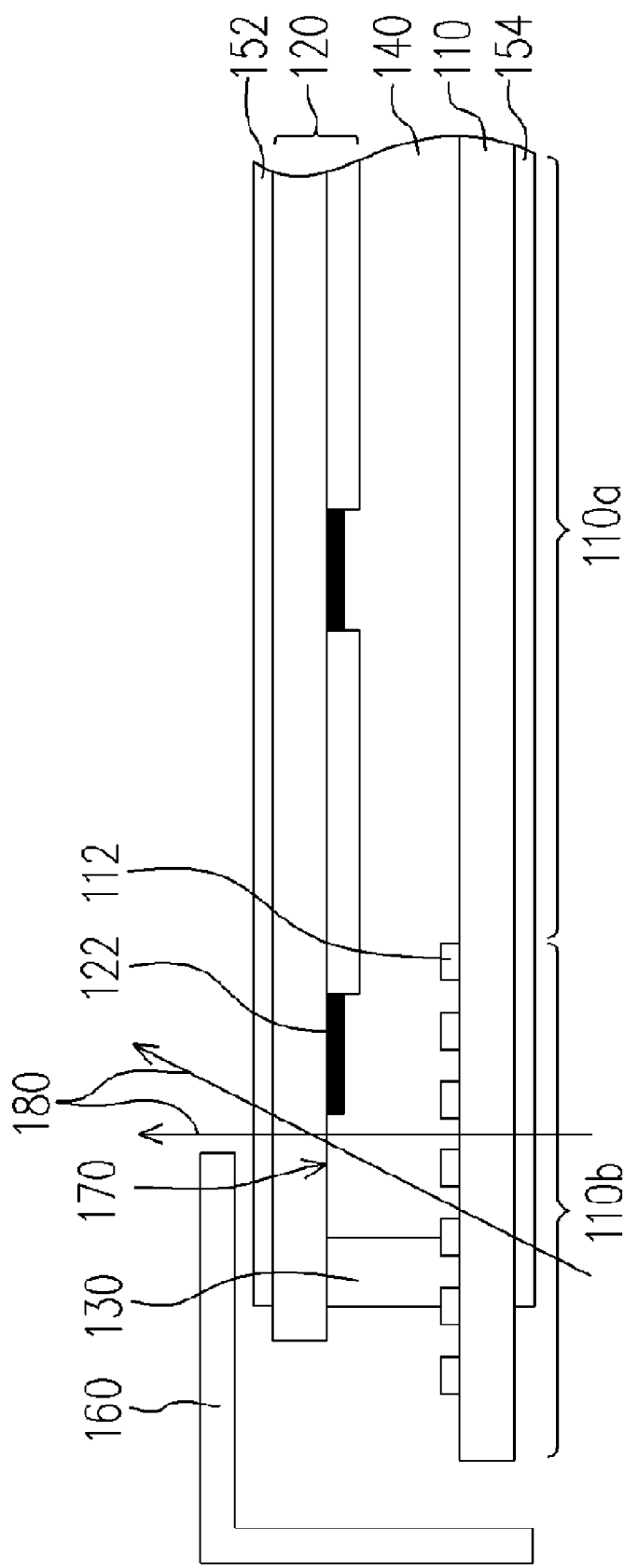
FIG. 1 is a sectional view of a prior liquid crystal display (LCD) module.
Figure 2:
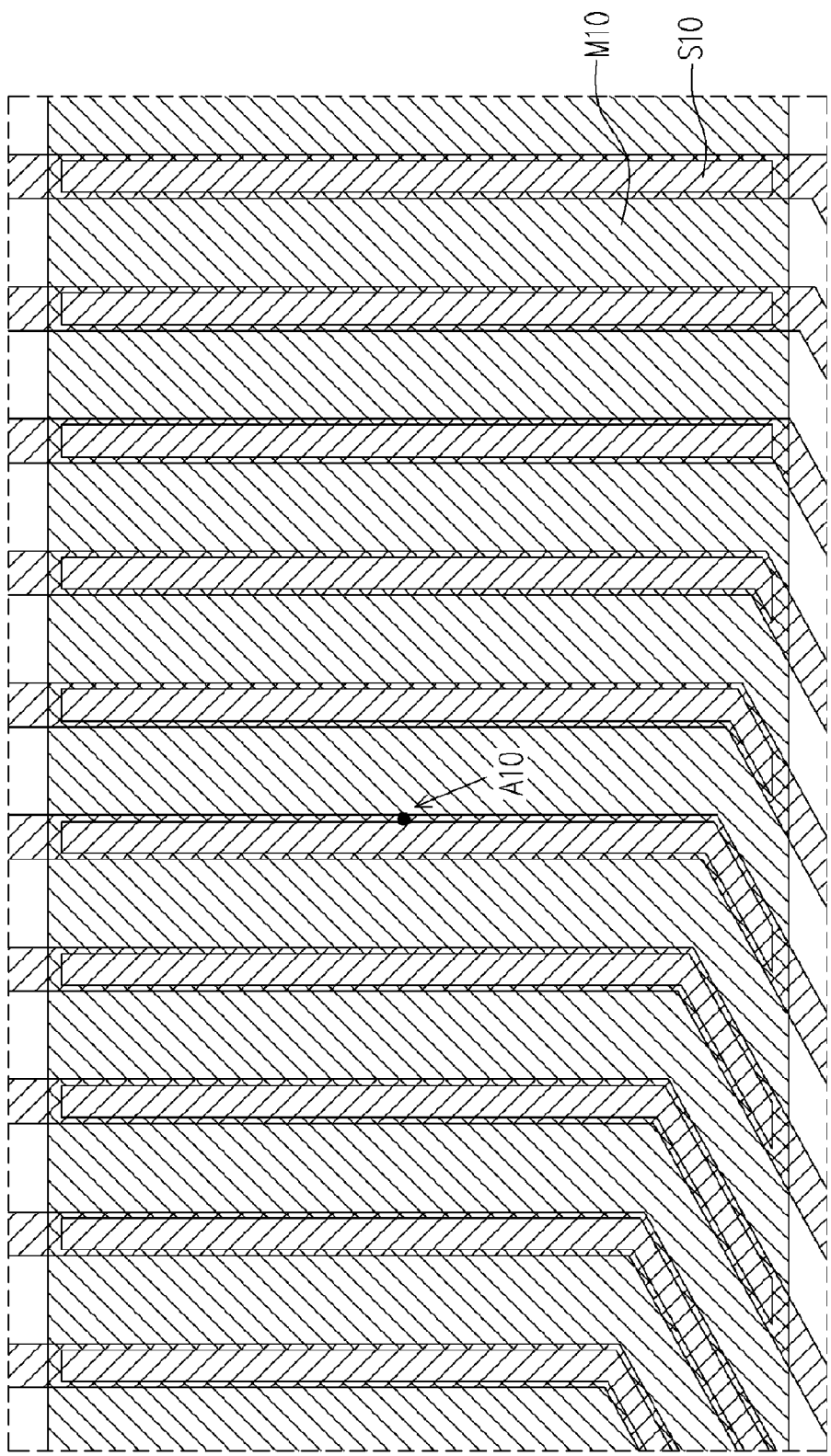
FIG. 2 shows a top view of the peripheral circuit region of the thin film transistor array substrate.

Reference will now be made in detail to the present preferred embodiments of the invention, examples of which are illustrated in the accompanying drawings. Wherever possible, the same reference numbers are used in the drawings and the description to refer to the same or like parts.

Figure 3:
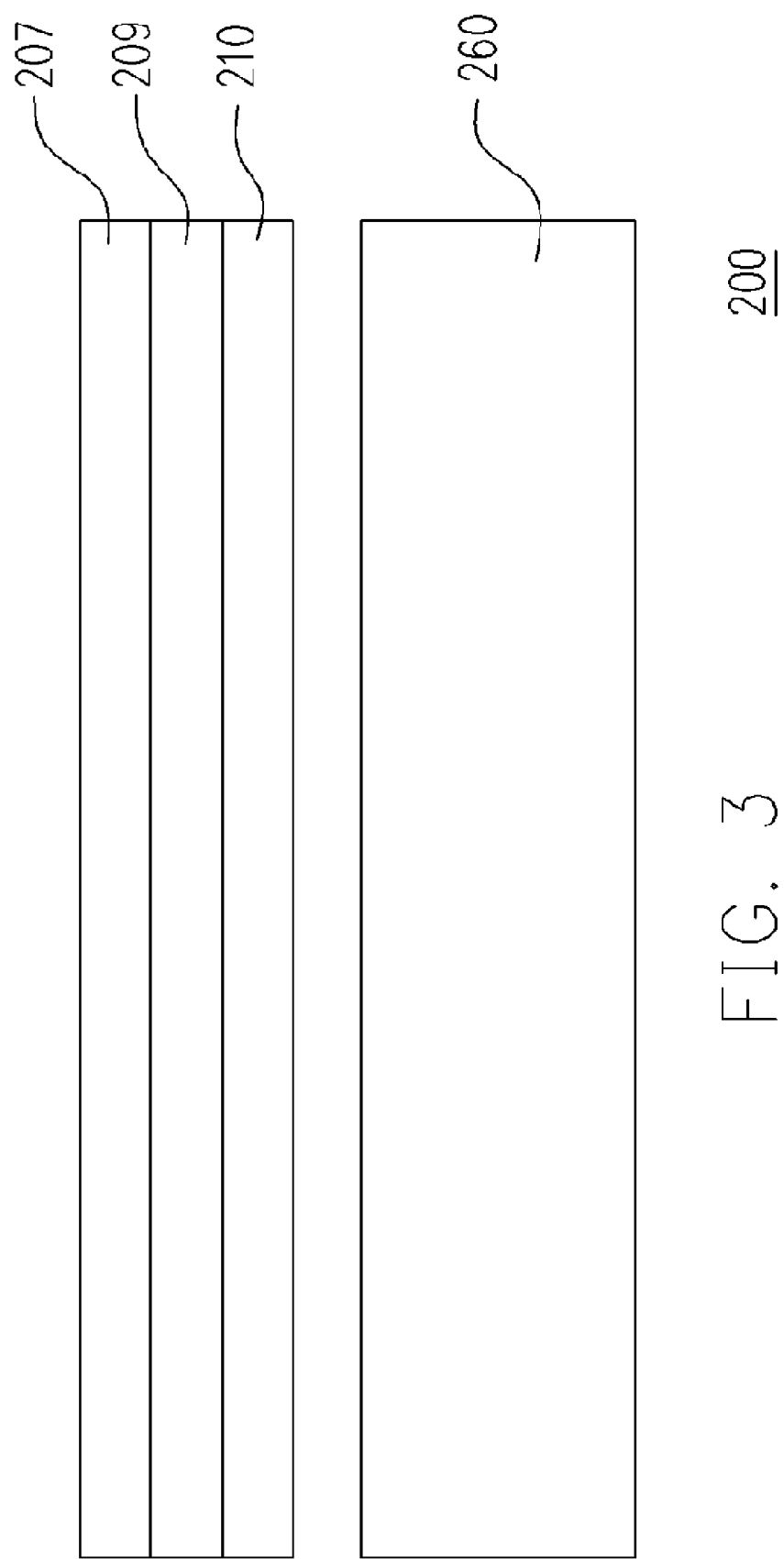
FIG. 3 shows a sectional view of a LCD module according to a preferred embodiment of the invention.

FIG. 3 shows a sectional view of a liquid crystal display (LCD) module according to a preferred embodiment of the invention. Referring to FIG. 3, a LCD module 200 includes a thin film transistor (TFT) array substrate 210, an opposite substrate 207 and a liquid layer 209. The TFT array substrate 210 is detailed described later. The liquid layer 209 is between the opposite substrate 207 and the TFT array substrate 210.

In this embodiment, the opposite substrate 207 is a color filter film substrate. The LCD module 200 further includes The back-light module 260 is disposed besides opposite substrate 207 or the thin firm transistor array substrate 210, for emitting light to the LCD panel 205. Now, the detail explanation of the TFT array substrate 210 is as follows.

Figure 4:
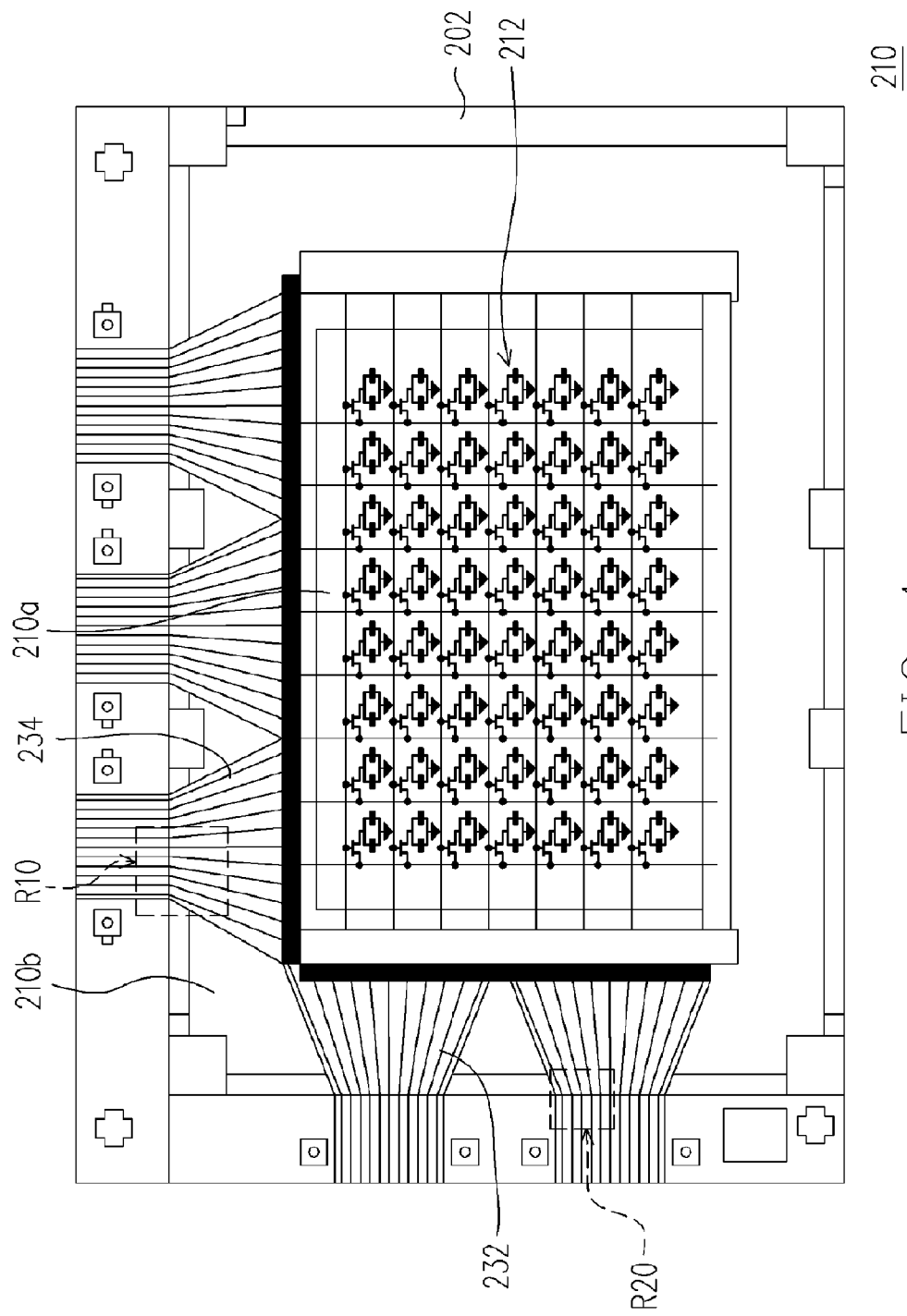
FIG. 4 shows a top view of the thin film transistor array substrate of LCD according to a preferred embodiment of the invention.
Figure 5:
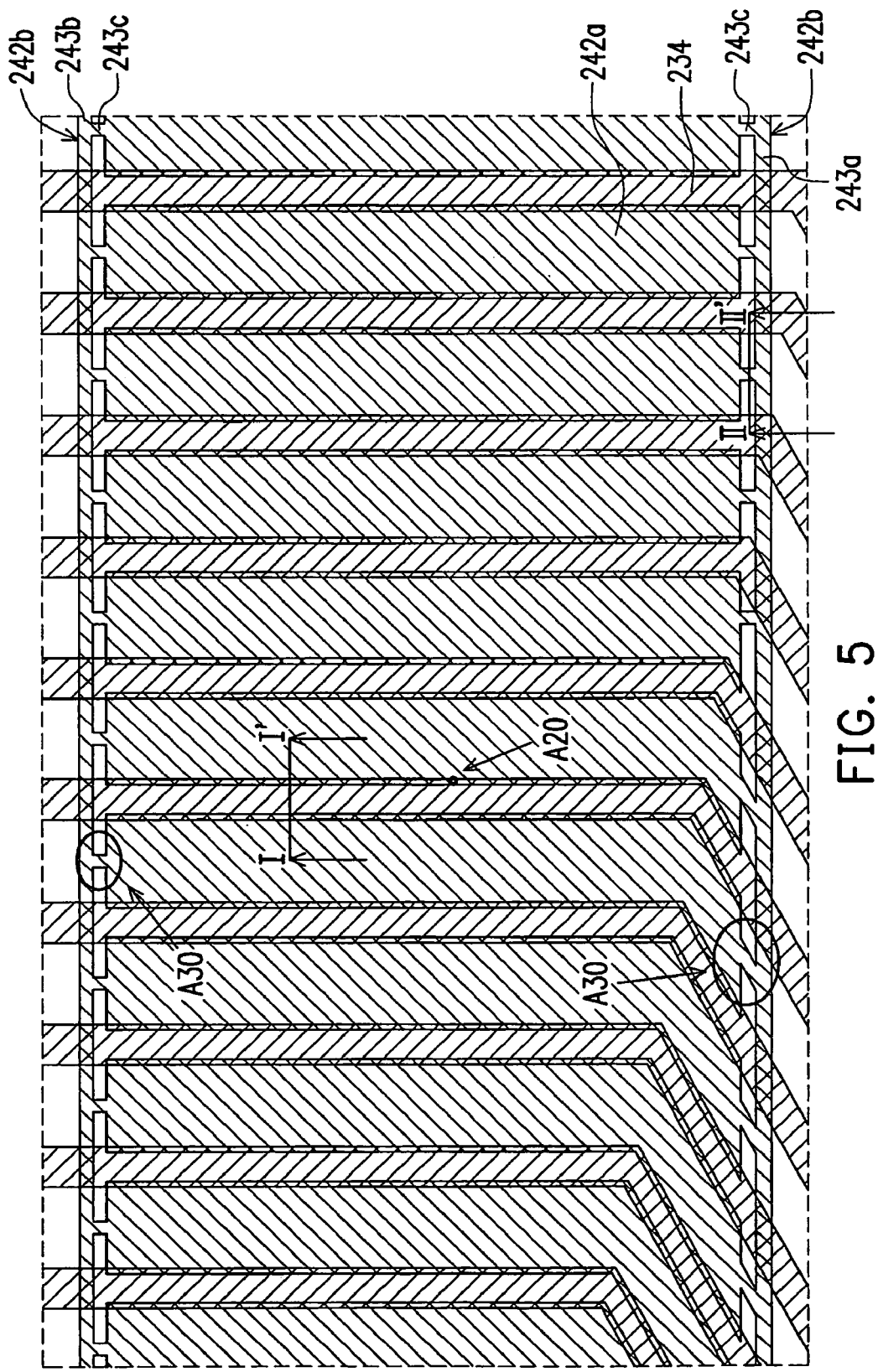
FIG. 5 shows an enlargement of an area R10 in FIG. 4.
Figure 6:
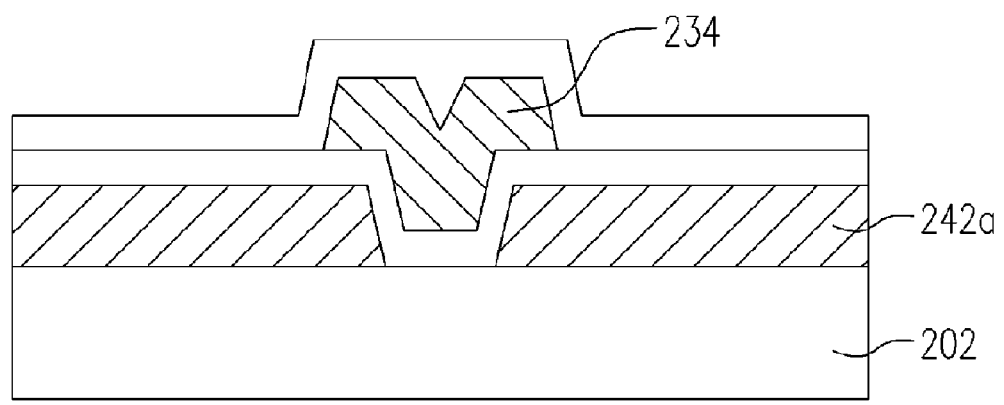
FIG. 6 and FIG. 7 show sectional views taken along lines I-I and II-II of FIG. 5, respectively.
Figure 7:
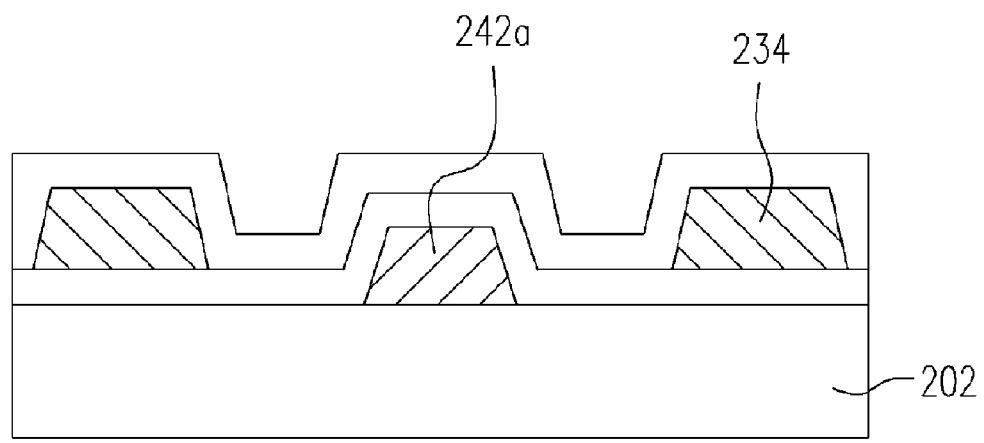

FIG. 4 shows a top view of the thin film transistor array substrate of LCD according to a preferred embodiment of the invention. FIG. 5 shows an enlargement of an area R10 in FIG. 4. FIG. 6 and FIG. 7 show sectional views taken along lines I-I' and II-II' of FIG. 5, respectively.

Please referring to FIG. 4 and FIG. 5, the TFT array substrate 210 includes a substrate 202, a TFT array 212, a plurality of first lines 232 (for example, gate lines), a plurality of second lines 234 (for example, source lines), a plurality of first shield lines 242a, and at least a first connection line 242b, for example, two connection lines 242b in FIG. 5. The substrate 202 includes a pixel region 202a and a peripheral circuit region 202b surrounding the pixel region 202a. The TFT array 212, formed of multiple TFTs and the pixel electrodes (not shown), are disposed on the pixel region 202a. The first and second lines 232 and 234 are disposed on the peripheral circuit region 202b. The TFT array 212 is for controlling arrangements of the liquid crystal layer 209.

The TFT array 212 is formed of a first metal or conducting layer (M1 layer) and a second metal or conducting layer (M2 layer). In the embodiment, the gate lines 232 are formed of the first metal and the source lines 234 are formed of the second metal. The first shield lines 242a and the first connection lines 242b are on the same layer.

Referring to FIG. 5 and FIG. 6, for shielding light, each of the first shield lines 242a is disposed between two adjacent source lines 234 for preventing light pass through the gaps between the source lines 234. For preventing leakage of light, sides of each shield line 242a is partially overlapped with the adjacent source lines 234. Terminals of the first shield line 242a are electrically connected to the first connection line 242b.

The first connection line 242b is coupled to a power supply (not shown) for coupling a predetermined voltage to the first shield lines 242a, to improve the signal interference between the source lines 234. This voltage improves an electrical inspection of the TFT array for checking whether there are shorts between the source lines 234 and the first shield lines 242a. In particular, the first connection line 242b comprising a first outer connection line 243a, a first inner connection line 243b and plurality of first connection parts 243c. The first outer connection line 243a electrically connects one end of each first shield line 242a through one of the first connection parts 243c, and the first inner connection line 243b electrically connects the other end of each of first shield line 242a through one the first connection parts 243c.

If there is particle contamination or static discharge during process, shorts may occur in the overlap, for example, pointed by an arrow A20 in FIG. 5, between the first shield lines 242a and the source lines 234. The first connection parts 243c connecting between the first shield lines 242a and the first outer connection line 243a/the first inner connection line 243b have smaller widths than the gaps between adjacent source lines 234. In other words, the first connection parts 243c are not overlapped with the source lines 234, as shown in FIG. 5 and FIG. 7. Even there are shorts between the first shield lines 242a and the source lines 234, because the first connection parts 243c to the source lines 234, marked by the arrow A 30 in FIG. 5, are smaller and not overlapped with the source lines 234, the shorts are repaired by cutting off the first connection parts 243c (marked by the arrow A30) by laser. By this, yield of the TFT array substrate is improved.

Figure 8:
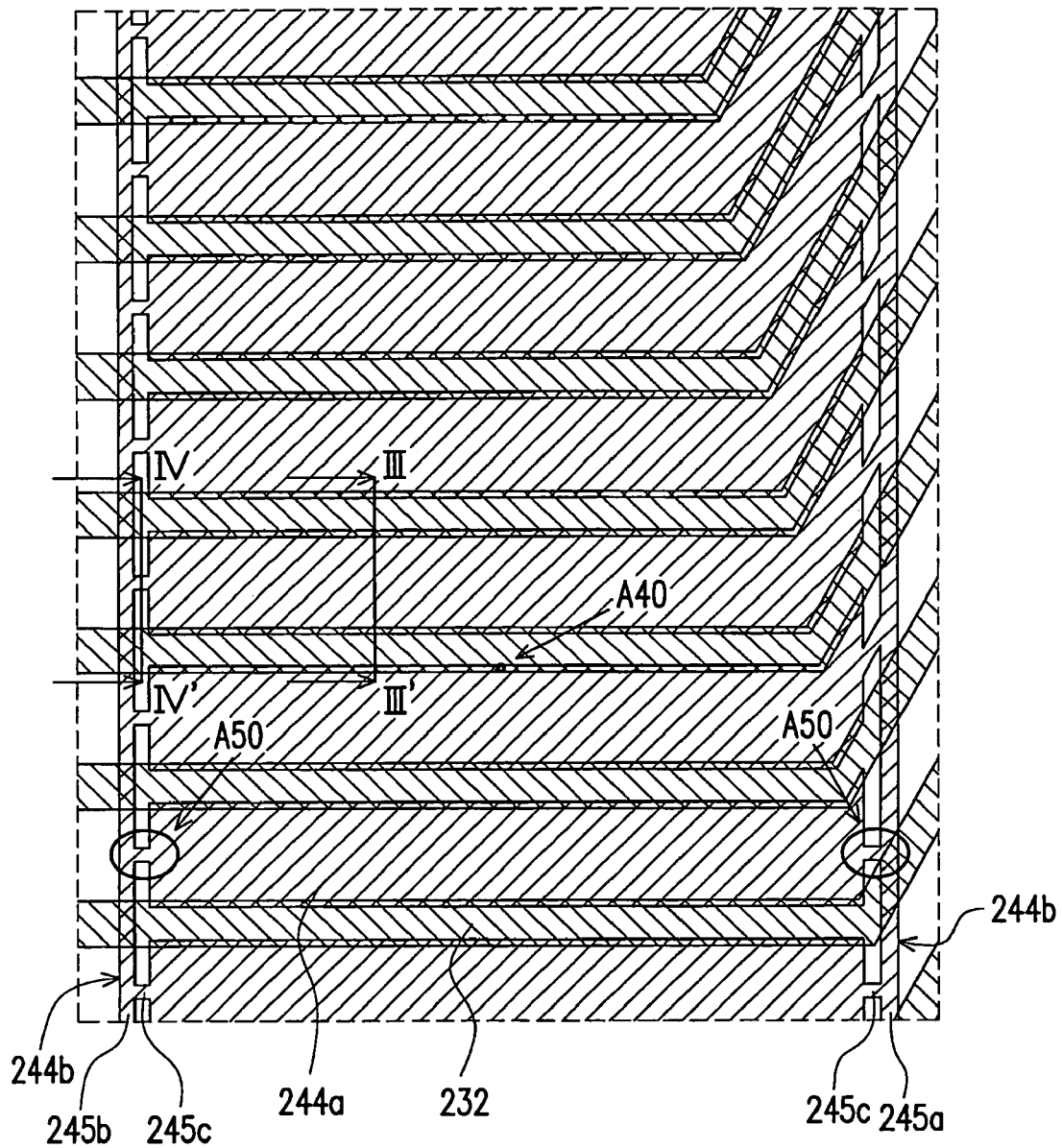
FIG. 8 shows an enlargement of an area R20 in FIG. 4.
Figure 9:
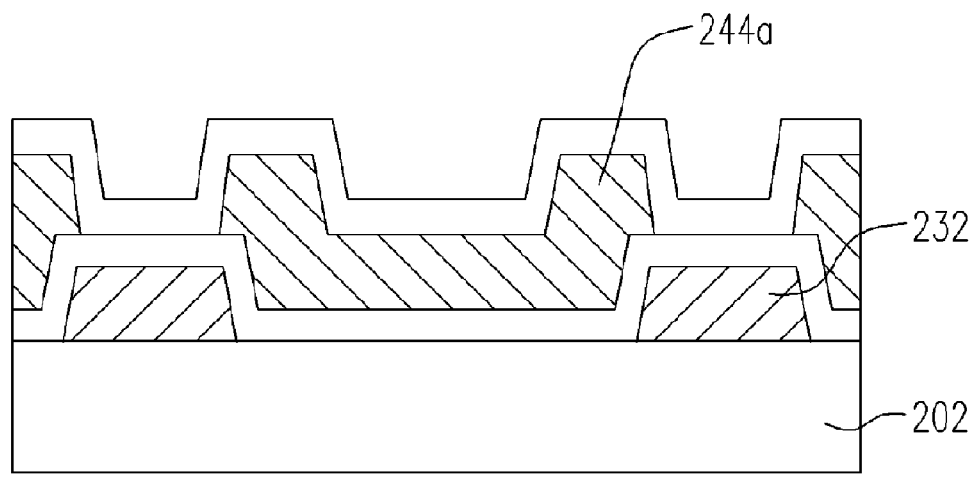
FIG. 9 and FIG. 10 show sectional views taken along lines III-III and IV-IV of FIG. 8, respectively.
Figure 10:
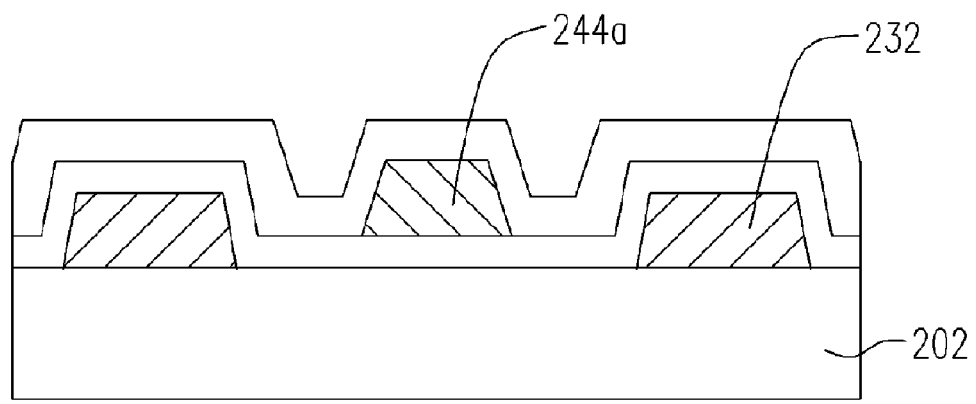

In the above exemplified discussion, the shield lines are disposed between the source lines 234. Other shield lines are disposed between the gate lines 232. FIG. 8 shows an enlargement of an area R20 in FIG. 4. FIG. 9 and FIG. 10 show sectional views taken along lines III-III' and IV-IV' of FIG. 8, respectively. Referring to FIG. 4 and FIG. 8, second shield lines 244a and at least a second connection line 244b (for example, two second connection lines in FIG. 8) are formed of the second metal. Referring to FIG. 8 and FIG. 9, for shielding light, each of the second shield lines 244a is disposed between two gate lines 232 for preventing light pass through the gaps between the gate lines 232. For prevention of light leakage, the second shield line 244a is partially overlapped with two adjacent gate lines 232. Terminals of the second shield lines 244a are electrically connected to the second connection line 244b.

The second connection line 244b is coupled to a power supply (not shown) for coupling another predetermined voltage to the second shield lines 244a, to improve signal interference between the gate lines 232. This voltage improves an electrical inspection of the TFT array for checking whether there are shorts between the gate lines 232 and the second shield lines 244a. In particular, the second connection line 244b comprising a second outer connection line 245a, a second inner connection line 245b and a plurality of second connection parts 245c. The second outer connection line 245a electrically connects one end of each second shield line 244a through one of the second connection parts 245c, and the second inner connection line 245b electrically connects the other end of each second shield line 244a through one of the second connection parts 245c.

Shorts maybe occur at the overlap, for example, pointed by an arrow A40 in FIG. 8, between the gate lines 232 and the second shield lines 244a. The second connection parts 245c connecting between the second shield lines 244a and the second outer connection line 245a/the second inner connection line 245b have smaller widths than gaps between adjacent gate lines 233. In other words, the second connection parts 245c are not overlapped with the gate lines 232, as shown in FIG. 8 and FIG. 10. Even there are shorts between the second shield lines 244a and the gate lines 232, because the second connection parts 245c to the gate lines 232, marked by A50 of FIG. 8, have smaller widths and are not overlapped with the gate lines 232, shorts are repaired by cutting off the second connection parts 245c by laser. By this, yield of the TFT array substrate is improved.

As above, in the LCD module and the TFT array substrate thereof, the shield lines made of first or second metal layer are disposed in the peripheral circuit region for preventing leakage of light. Besides, by feeding predetermined voltages on the shield lines, the signal interference between gate/source lines is improved. Connections parts of the shield lines to connection lines are not overlapped with gate/source lines and have smaller widths. When shorts occur at the overlap between the gate/source lines and the shield lines, they are repaired by cutting off by laser. Therefore, yield of the TFT module is improved.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A thin film transistor array substrate, comprising:
   a substrate, having a pixel region and a peripheral circuit region surrounding the pixel region;
   a thin film transistor array, disposed in the pixel region, the thin film transistor array including a first conductive layer and a second conductive layer;
   a plurality of first lines, disposed in the peripheral circuit region, the first lines being on the same layer of the first conductive layer;
   a plurality of second lines, disposed in the peripheral circuit region, the second lines being on the same layer of the second conductive layer;
   a plurality of first shield lines, disposed in the peripheral circuit region, the first shield lines being between and overlapped with the second lines for preventing lights pass through gaps between the second lines; and
   a first connection line comprising a first outer connection line, a first inner connection line and a plurality of first connection parts, the first outer connection line electrically connecting one end of each first shield line through one of the first connection parts, the first inner connection line electrically connecting the other end of each first shield line through one of the first connection parts, the first shield lines and the first connection line being on the same layer of the first conductive layer;
   wherein the first connection parts have widths smaller than gaps between the second lines.

2. The thin film transistor array substrate of claim 1, wherein each of the first shield lines has side parts overlapped with adjacent second lines.

3. The thin film transistor array substrate of claim 1, further comprising:
   a plurality of second shield lines, disposed in the peripheral circuit region, the second shield lines being between with the first lines for preventing lights pass through gaps between the first lines; and
   a second connection line, electrically connected to the second shield lines, the second shield lines and the second connection line being on the same layer of the second conductive layer;
   wherein connection parts of the second shield lines to the second connection line have smaller widths than gaps between the first lines.

4. The thin film transistor array substrate of claim 3, wherein each of the second shield line has side parts overlapped with adjacent first lines.

5. The thin film transistor array substrate of claim 3, wherein, a first predetermined voltage is coupled to the first shield lines and the first connection line.

6. The thin film transistor array substrate of claim 5, wherein, a second predetermined voltage is coupled to the second shield lines and the second connection line.

7. The thin film transistor array substrate of claim 1, wherein, predetermined voltage is coupled to the first shield lines and the first connection line.

8. The thin film transistor array substrate of claim 1, wherein, the first conductive layer is a gate layer and the second conductive layer is a source/drain layer.

9. The thin film transistor array substrate of claim 1, wherein, the first conductive layer is a source/drain layer and the second conductive layer is a gate layer.

10. A liquid crystal display, comprising:
    a thin film transistor array substrate, having:
    a substrate, having a pixel region and a peripheral circuit region surrounding the pixel region;
    a thin film transistor array, disposed in the pixel region, the thin film transistor array including a first conductive layer and a second conductive layer;
    a plurality of first lines, disposed in the peripheral circuit region, the first lines being on the same layer of the first conductive layer;
    a plurality of second lines, disposed in the peripheral circuit region, the second lines being on the same layer of the second conductive layer;
    a plurality of first shield lines, disposed in the peripheral circuit region, the first shield lines being between and overlapped with the second lines for preventing lights pass through gaps between the second lines; and
    a first connection line comprising a first outer connection line, a first inner connection line and a plurality of first connection parts. the first outer connection line electrically connecting one end of each first shield line through one of the first connection parts, the first inner connection line electrically connecting the other end of each first shield line through one of the first connection parts, the first shield lines and the first connection line being on the same layer of the first conductive layer;

wherein the first connection parts have widths smaller than gaps between the second lines, an opposite substrate; and a liquid crystal layer, between the thin firm transistor array substrate and the opposite substrate, the thin film transistor array used for controlling arrangements of the liquid crystal layer.

11. The liquid crystal display of claim 10, wherein each of the first shield lines has side parts overlapped with adjacent second lines.

12. The liquid crystal display of claim 10, wherein the thin firm transistor array substrate further comprises:

a plurality of second shield lines, disposed in the peripheral circuit region, the second shield lines being between with the first lines for preventing lights pass through gaps between the first lines; and a second connection line, electrically connected to the second shield lines, the second shield lines and the second connection line being on the same layer of the second conductive layer;

wherein connection parts of the second shield lines to the second connection line have smaller widths than gaps between the first lines.

13. The liquid crystal display of claim 12, wherein each of the second shield line has side parts overlapped with adjacent first lines.

14. The liquid crystal display of claim 12, wherein, a first predetermined voltage is coupled to the first shield lines and the first connection line.

15. The liquid crystal display of claim 14, wherein, a second predetermined voltage is coupled to the second shield lines and the second connection line.

16. The liquid crystal display of claim 10, wherein, a predetermined voltage is coupled to the first shield lines and the first connection line.

17. The liquid crystal display of claim 10, wherein, the first conductive layer is a gate layer and the second conductive layer is a source/drain layer.

18. The liquid crystal display of claim 10, wherein, the first conductive layer is a source/drain layer and the second conductive layer is a gate layer.

19. The liquid crystal display of claim 10, wherein, the opposite substrate comprises a color filter film substrate.

20. The liquid crystal display of claim 10, further comprising a back light module, formed besides the opposite substrate or the thin film transistor array substrate, for emitting light.

* * * * *